(12) United States Patent
Maeda et al.

(10) Patent No.: US 11,714,339 B2
(45) Date of Patent: Aug. 1, 2023

(54) IMAGE READING APPARATUS

(71) Applicant: PFU Limited, Ishikawa (JP)

(72) Inventors: Yuki Maeda, Ishikawa (JP); Yasuhiko Kitagawa, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 17/526,917

(22) Filed: Nov. 15, 2021

(65) Prior Publication Data
US 2022/0187691 A1 Jun. 16, 2022

(30) Foreign Application Priority Data
Dec. 14, 2020 (JP) ................. 2020-206684

(51) Int. Cl.
*G03B 17/56* (2021.01)
*G08B 13/196* (2006.01)

(52) U.S. Cl.
CPC ....... *G03B 17/561* (2013.01); *G08B 13/1963* (2013.01); *G03B 2205/00* (2013.01); *G08B 13/19619* (2013.01)

(58) Field of Classification Search
CPC .. G03B 17/561; G03B 2205/00; G03B 17/02; G08B 13/1963; G08B 13/19619
See application file for complete search history.

(56) References Cited

U.S. PATENT DOCUMENTS

| 8,767,120 B2 | 7/2014 | Takizawa |
| 10,564,525 B2 | 2/2020 | Kanayama |
| 2001/0017665 A1 | 8/2001 | Ackermann et al. |
| 2009/0297137 A1* | 12/2009 | Entis ............. G03B 17/02 396/428 |

FOREIGN PATENT DOCUMENTS

| JP | 2001-211676 A | | 8/2001 | |
| JP | 2001211676 A | * | 8/2001 | ............ H02N 2/103 |
| JP | 2019-071566 A | | 5/2019 | |
| WO | 2012/004952 A1 | | 1/2012 | |

* cited by examiner

*Primary Examiner* — Yogesh K Aggarwal
(74) *Attorney, Agent, or Firm* — McDermott Will & Emery LLP

(57) ABSTRACT

An image reading apparatus includes a placement board, a camera that captures an image of a subject placed on the placement board, a first holding member to which the camera is fixed, a second holding member that is fixed to the placement board, and a fixing portion that fixes the first holding member to the second holding member, wherein a sliding surface along a spherical surface is formed on one of the first holding member and the second holding member, three contact points disposed at three different positions respectively are formed on the other one of the first holding member and the second holding member, the first holding member is rotatably supported about three axes by the second holding member as a result of the three contact points coming into contact with the sliding surface, and the camera is disposed inside the spherical surface.

6 Claims, 11 Drawing Sheets

IMAGE READING APPARATUS

CROSS-REFERENCE TO RELATED APPLICATION

This application is based upon and claims the benefit of priority of the prior Japanese Patent Application No. 2020-206684, filed on Dec. 14, 2020, the entire contents of which are incorporated herein by reference.

FIELD

The technology disclosed in the present disclosure relates to an image reading apparatus.

BACKGROUND

There is a known identity verification apparatus that captures an image of an identity verification document placed on a placement board and that performs character recognition on characters written on the identity verification document.

There is a known image capturing apparatus provided with an actuator that rotates a camera about a plurality of rotation axes (Japanese Laid-open Patent Publication No. 2001-211676, International Publication Pamphlet No. WO 2012/004952, and Japanese Laid-open Patent Publication No. 2019-71566). Low-cost cameras are sometimes manufactured with a low degree of accuracy and positional relationships between an outer shell of a camera and the angle of view of the camera are sometimes individually different for each camera. If this type of camera is installed in an identity verification apparatus, even when the outer shell of the camera is appropriately fixed to a placement board at a predetermined position, in some cases, an image of an identity verification document that is appropriately placed on the placement board is not appropriately captured. There is a problem in that, in the identity verification apparatus, character recognition of the characters written on the identity verification document is not appropriately performed when the image of the identity verification document is not appropriately captured.

SUMMARY

According to an aspect of an embodiment, an image reading apparatus includes a placement board, a camera that captures an image of a subject placed on the placement board, a first holding member to which the camera is fixed, a second holding member that is fixed to the placement board, and a fixing portion that fixes the first holding member to the second holding member, wherein a sliding surface along a spherical surface is formed on one of the first holding member and the second holding member, three contact points disposed at three different positions respectively are formed on the other one of the first holding member and the second holding member, the first holding member is rotatably supported about three axes by the second holding member as a result of the three contact points coming into contact with the sliding surface, and the camera is disposed inside the spherical surface.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Figure 1:
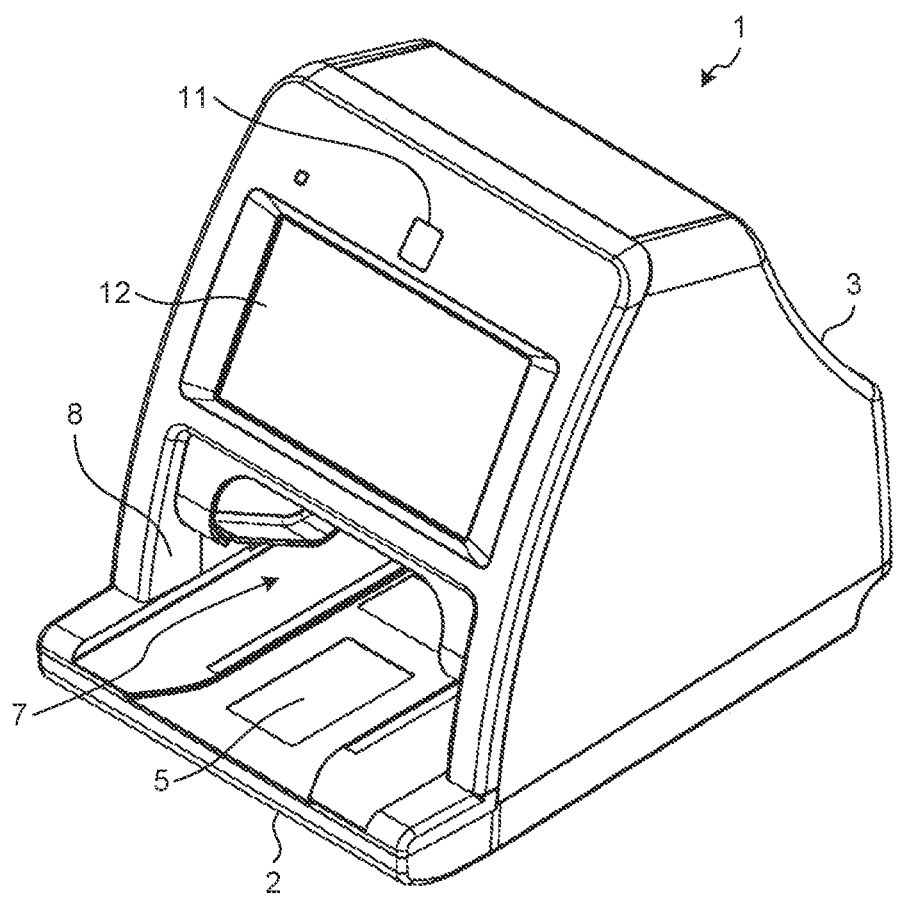
FIG. 1 is a perspective view illustrating an identity verification apparatus in which an image reading apparatus according to an embodiment is installed.

Preferred embodiments of an image reading apparatus disclosed in the present disclosure will be explained below with reference to the accompanying drawings. Furthermore, the technology of the present disclosure is not limited to the embodiments. Furthermore, in the description below, the same reference numerals are assigned to the same components and descriptions of overlapping portions will be omitted.

Embodiment

As illustrated in FIG. 1, the image reading apparatus according to the embodiment is installed in an identity verification apparatus 1. FIG. 1 is a perspective view illustrating the identity verification apparatus 1 in which an image reading apparatus according to the embodiment is installed. The identity verification apparatus 1 includes a placement board 2 and a cover 3. The placement board 2 is formed in a substantially plate shape. A placement surface 5 is formed on the placement board 2. The placement board 2 is placed on an installation surface on which the identity verification apparatus 1 such that the placement surface 5 faces upwardly.

The cover 3 is formed in a box shape. The cover 3 forms an outer shell of the identity verification apparatus 1. In the cover 3, a lower-side opening 7 and a front-side opening 8 are formed. The lower-side opening 7 is formed in an area on the lower side of the cover 3. The front-side opening 8 is formed in an area on the front side of the cover 3. The cover 3 is disposed on the placement board 2 and fixed to the placement board 2 such that the cover 3 faces the placement surface 5 of the placement board 2 and, in addition, the lower-side opening 7 is covered by the placement board 2. The inner part of the cover 3 is connected to outside the cover 3 via the front-side opening 8.

The identity verification apparatus 1 further includes a face authentication camera 11 and a touch panel 12. The face authentication camera 11 is disposed on the front side of the cover 3 and is fixed to the cover 3, i.e., is fixed to the placement board 2 via the cover 3. The touch panel 12 is disposed on the lower side of the face authentication camera 11 disposed at the cover 3 and is fixed to the cover 3.

Figure 2:
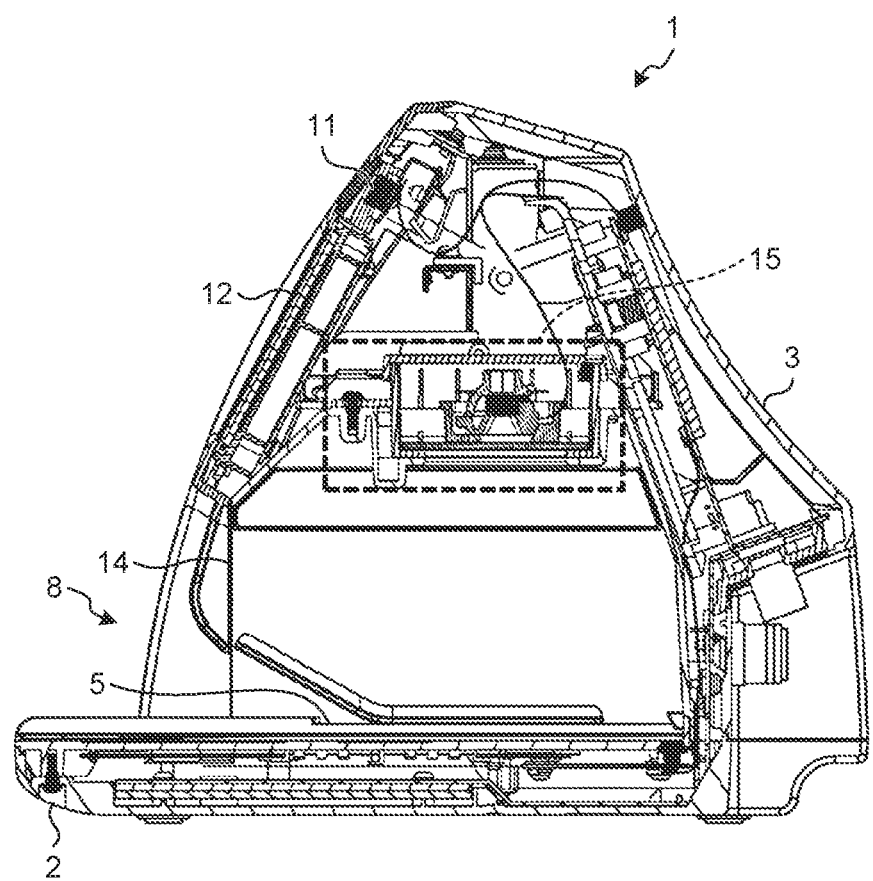
FIG. 2 is a sectional view illustrating the identity verification apparatus.

FIG. 2 is a sectional view illustrating the identity verification apparatus 1. The identity verification apparatus 1 further includes a frame 14 and an image capturing unit 15. The frame 14 is disposed inside the cover 3 and is fixed to the placement board 2. The image capturing unit 15 is disposed above the frame 14 inside the cover 3. The image capturing unit 15 is fixed to the frame 14, i.e., is fixed to the placement board 2 via the frame 14.

Figure 3:
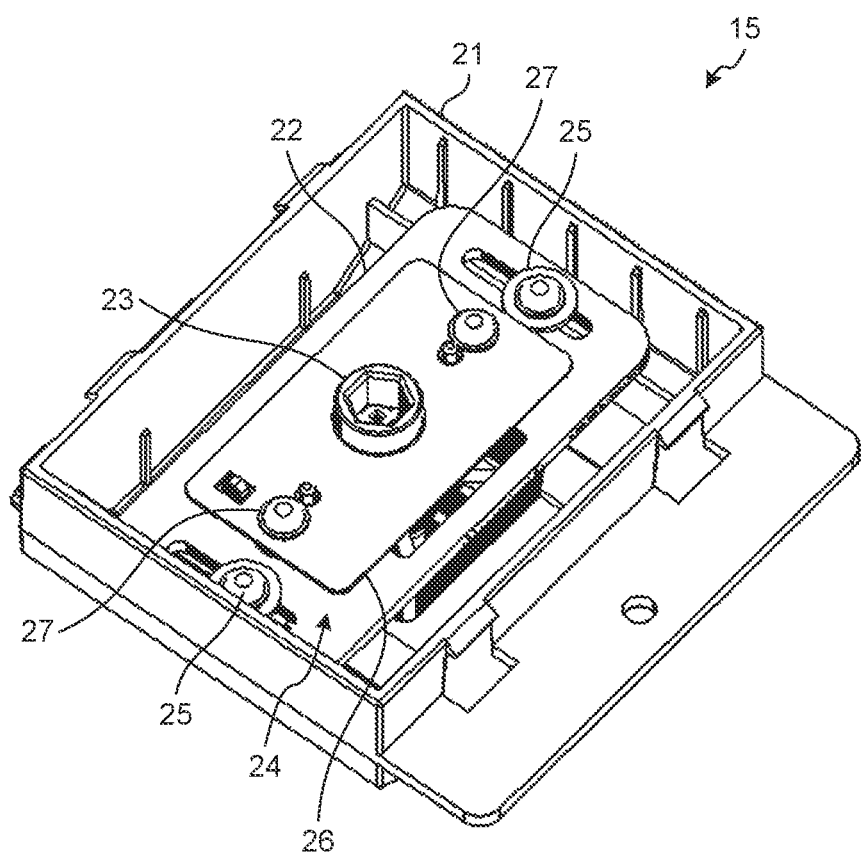
FIG. 3 is a perspective view illustrating an image capturing unit.

FIG. 3 is a perspective view illustrating the image capturing unit 15. The image capturing unit 15 includes a fixed holding member 21, a slide holding member 22, a rotation holding member 23, a rotational fixing portion 24, and two slide fixing screws 25. The rotational fixing portion 24 includes a retainer plate 26 and two screws 27.

Figure 4:
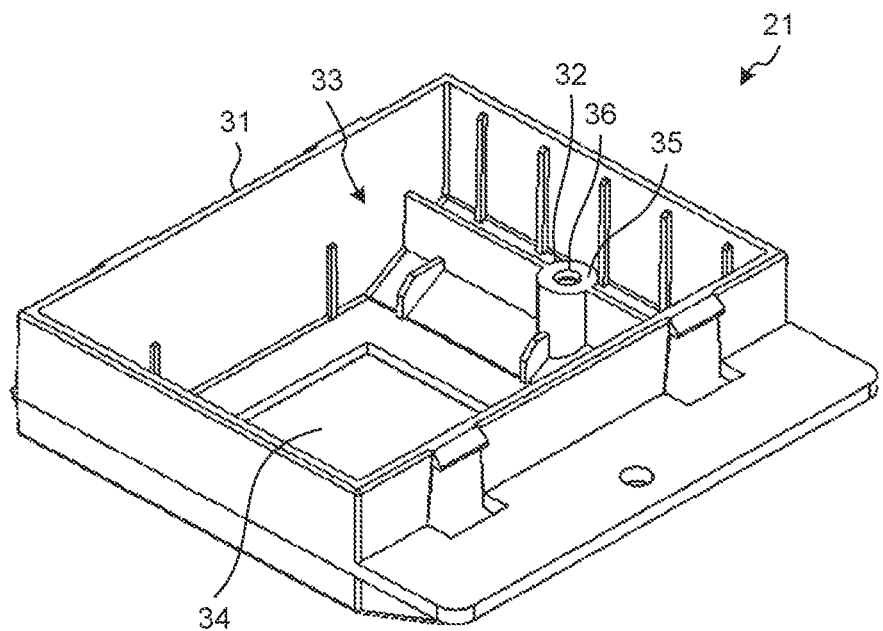
FIG. 4 is a perspective view illustrating a fixed holding member.

FIG. 4 is a perspective view illustrating the fixed holding member 21. The fixed holding member 21 includes a fixed-holding-member main body 31 and two boss portions 32. The fixed-holding-member main body 31 is formed in a substantially box shape. A slide member storage space 33 is formed inside the fixed-holding-member main body 31. An image capturing opening 34 is formed on the bottom portion of the fixed-holding-member main body 31. The two boss portions 32 are disposed in the slide member storage space 33 such that the image capturing opening 34 is disposed between the two boss portions 32, are formed integrally with the fixed-holding-member main body 31, and are fixed to the fixed-holding-member main body 31. Two sliding surfaces 35 and two female threaded screws 36 are formed on the two boss portions 32, respectively.

One sliding surface of the two sliding surfaces 35 is formed on one of the two boss portions 32. The other sliding surface (not illustrated) of the two sliding surfaces 35 is formed on the other boss portion (not illustrated) of the two boss portions 32. The two boss portions 32 are formed such that the two sliding surfaces 35 are along a single plane. One female threaded screw of the two female threaded screws 36 is formed at the center of one sliding surface of the two sliding surfaces 35. The other female threaded screw (not illustrated) of the two female threaded screws 36 is formed at the center of the other sliding surface of the two sliding surfaces 35.

Figure 5:
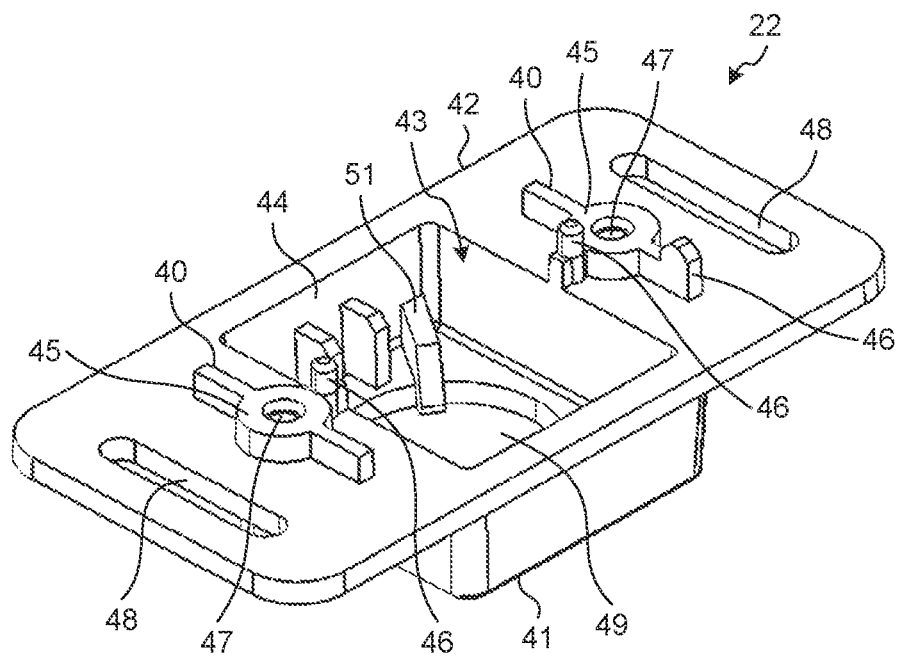
FIG. 5 is a perspective view illustrating a slide holding member.

FIG. 5 is a perspective view illustrating the slide holding member 22. The slide holding member 22 includes a box shaped portion 41 and a flange portion 42. The box shaped portion 41 is formed in a substantially cuboid box shape, and a rotating member storage space 43 is formed inside the box shaped portion 41. An image capturing opening 49 is formed on the bottom portion of the box shaped portion 41. The flange portion 42 is formed in a plate shape. An opening portion 44 is formed at the center of the flange portion 42. The flange portion 42 is formed integrally with the box shaped portion 41 such that the rotating member storage space 43 is connected to outside the box shaped portion 41 via the opening portion 44.

The slide holding member 22 further includes two bosses 40. The two bosses 40 are disposed on both sides of the opening portion 44 such that the opening portion 44 is disposed between the two bosses 40. The two bosses 40 project from the flange portion 42 toward the opposite side of the side on which the box shaped portion 41 is disposed and are formed integrally with the flange portion 42.

Two mounting surfaces 45, three projections 46, and two female threaded screws 47 are formed on the two bosses 40. One mounting surface of the two mounting surfaces 45 is formed on one boss of the two bosses 40. The other mounting surface of the two mounting surfaces 45 is formed on the other boss of the two bosses 40. The two bosses 40 are formed such that both of the two mounting surfaces 45 are along a single plane that is parallel to the plane along which the flange portion 42 is formed. The three projections 46 are formed so as to protrude toward the side on which the two mounting surfaces 45 face each other. The two female threaded screws 47 are formed at the center of the two mounting surfaces 45, respectively.

Two long holes 48 are further formed on the flange portion 42. The two long holes 48 are formed on the both sides of the opening portion 44 such that the opening portion 44 is disposed between the two long holes 48 and, in addition, the two long holes 48 are to be along the two parallel lines, respectively.

Figure 6:
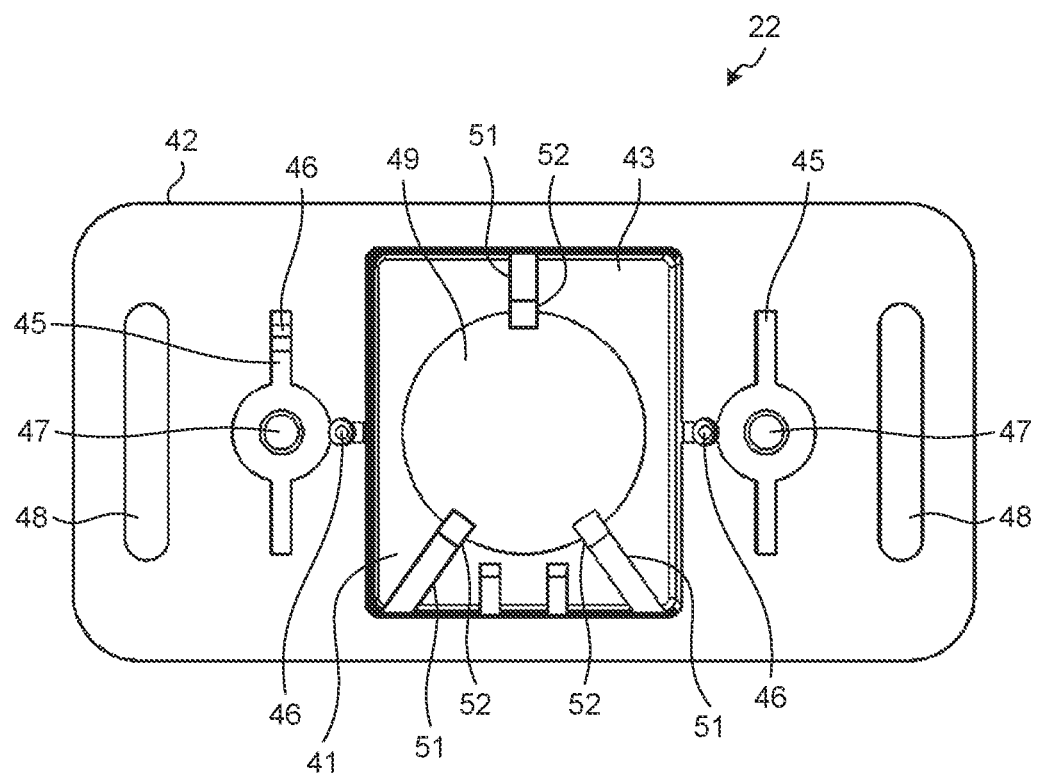
FIG. 6 is a plan view illustrating the slide holding member.

FIG. 6 is a plan view illustrating the slide holding member 22. The slide holding member 22 further includes three boss portions 51. The three boss portions 51 are disposed in the rotating member storage space 43 such that the three boss portions 51 surround the image capturing opening 49 and are integrally formed with the box shaped portion 41. Three contact points 52 are formed on the three boss portions 51, respectively. The three boss portions 51 are formed such that the three contact points 52 are disposed at the three different positions and, in addition, the three contact points 52 are not disposed on a single straight line.

Figure 7:
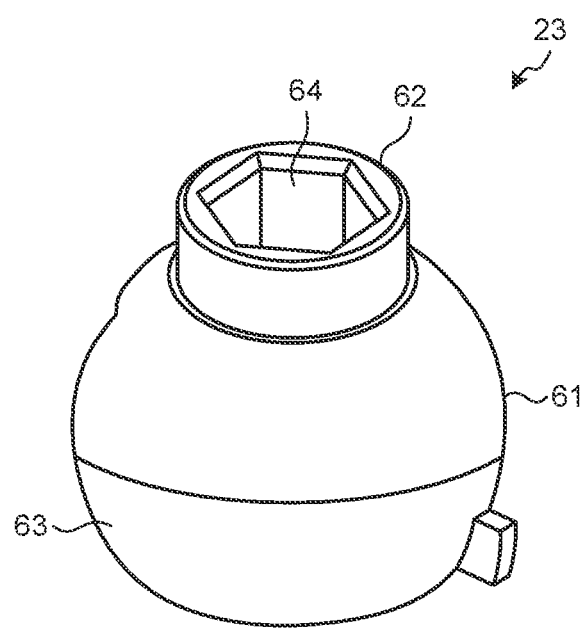
FIG. 7 is a perspective view illustrating a rotation holding member.

FIG. 7 is a perspective view illustrating the rotation holding member 23. The rotation holding member 23 includes a spherical shape portion 61 and a boss portion 62. The spherical shape portion 61 is formed in a substantially spherical shape. A sliding surface 63 is formed on the spherical shape portion 61. The sliding surface 63 is formed so as to be along the spherical surface and is formed to have a convex surface. The boss portion 62 is formed in a substantially cylindrical shape. The boss portion 62 is formed integrally with the spherical shape portion 61 such that one end of the boss portion 62 is adjacent to a part of the spherical shape portion 61. A fitting hole 64 is formed on the boss portion 62. The fitting hole 64 is formed in a hexagonal prism shape such that the side walls of the fitting hole 64 are along the side surfaces of the regular hexagonal prism.

Figure 8:
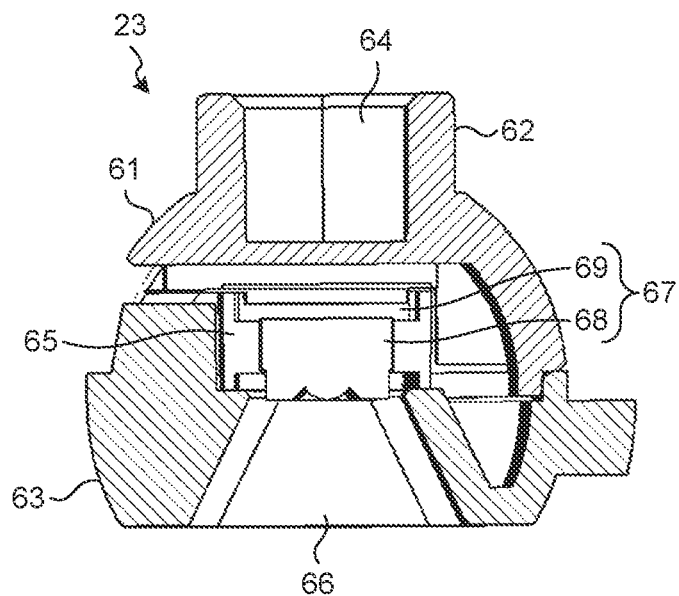
FIG. 8 is a sectional view illustrating the rotation holding member.

FIG. 8 is a sectional view illustrating the rotation holding member 23. A camera storage space 65 and an image capturing opening 66 are further formed in the spherical shape portion 61 included in the rotation holding member 23. The camera storage space 65 is formed inside the spherical shape portion 61 such that the center of the spherical surface along which the sliding surface 63 is formed is included in the camera storage space 65. The image capturing opening 66 is disposed in the area opposite to the area in which the boss portion 62 of the spherical shape portion 61 is connected. The camera storage space 65 is connected to outside the spherical shape portion 61 via the image capturing opening 66.

The image capturing unit 15 further includes a camera 67. The camera 67 includes a camera main body 68 and a camera outer shell 69. The camera main body 68 captures an image of a subject disposed within the angle of view that is set to the camera main body 68. The camera outer shell 69 is formed in a predetermined shape, covers the camera main body 68, and is fixed to the camera main body 68. The camera 67 is disposed in the camera storage space 65 such that the camera main body 68 overlaps at the center of the spherical surface along which the sliding surface 63 is formed and, in addition, the angle of view of the camera main body 68 overlaps the image capturing opening 66. The camera outer shell 69 is fitted to the camera storage space 65, so that the camera 67 is fixed to the rotation holding member 23.

Figure 9:
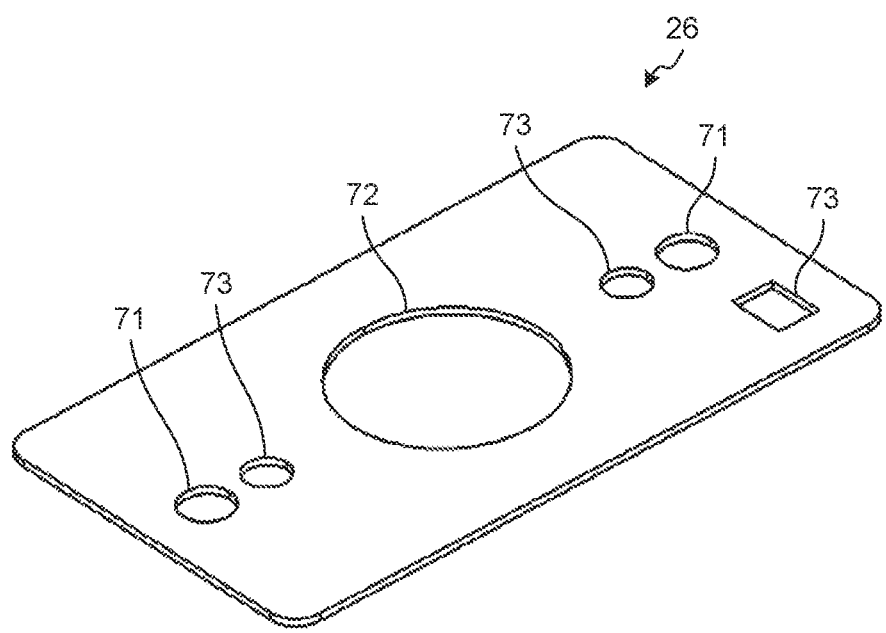
FIG. 9 is a perspective view illustrating a retainer plate.

FIG. 9 is a perspective view illustrating the retainer plate 26. The retainer plate 26 is formed of an elastic body exemplified by a metal and is formed in a plate shape. Two fixing holes 71, an opening portion 72, and three fitting holes 73 are formed on the retainer plate 26. The two fixing holes 71 are formed at both ends of the retainer plate 26. The opening portion 72 is formed at the center of the retainer plate 26 such that the opening portion 72 is disposed between the two fixing holes 71 and, in addition, the opening portion 72 is disposed among the three fitting holes 73. The opening portion 72 is formed in a substantially round shape. The diameter of the circle along which the opening portion 72 is formed is smaller than the diameter of the spherical surface along which the sliding surface 63 is formed and is greater than the diameter of the cylindrical portion along which the boss portion 62 is formed. The three fitting holes 73 are formed such that the opening portion 72 is surrounded by the three fitting holes 73.

Figure 10:
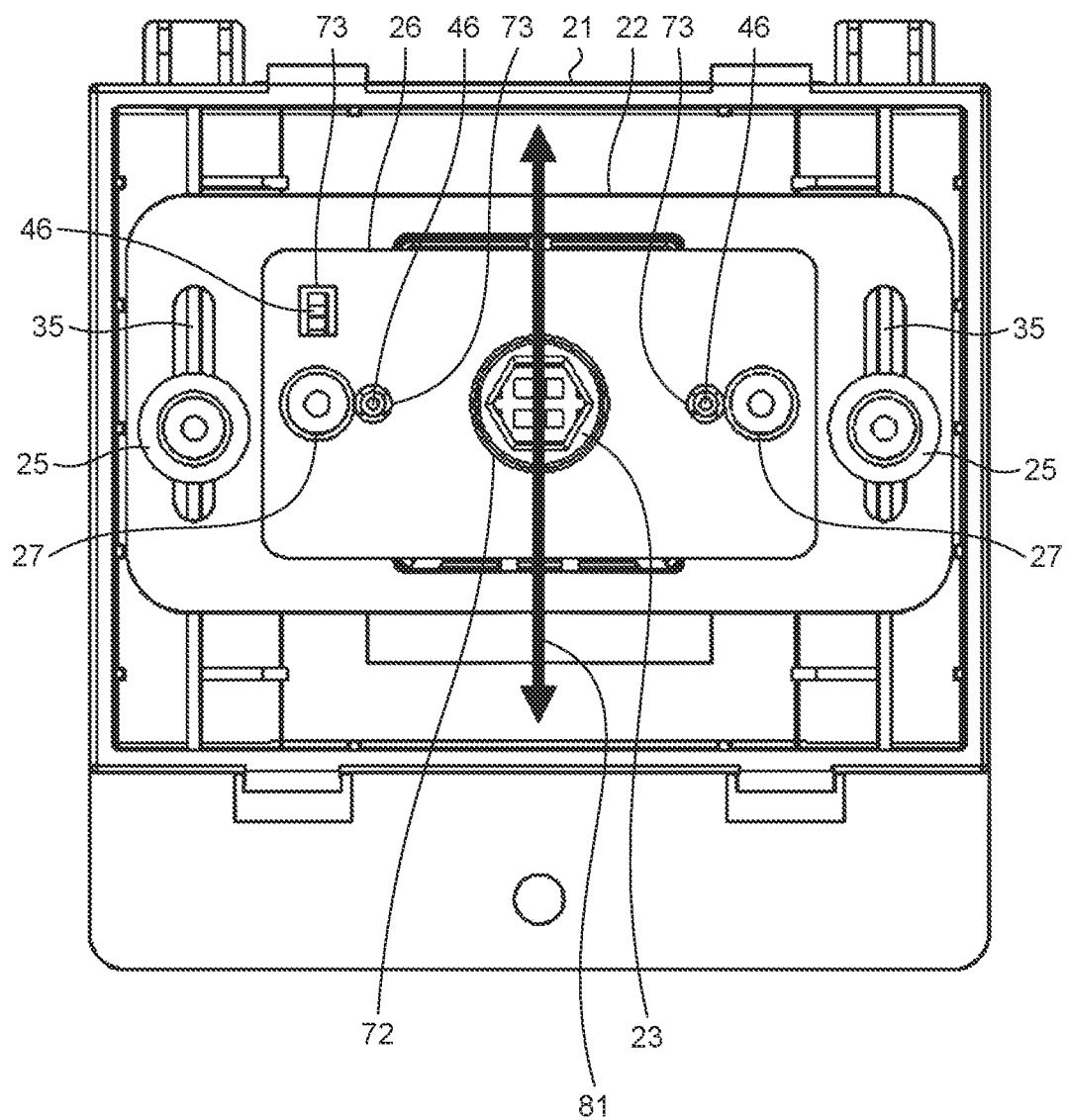
FIG. 10 is a plan view illustrating the image capturing unit.

The fixed holding member 21 is fixed to the frame 14, i.e., is fixed to the placement board 2 via the frame 14. FIG. 10 is a plan view illustrating the image capturing unit 15. The slide holding member 22 is disposed in the slide member storage space 33 such that the image capturing opening 49 is connected to the image capturing opening 34 of the fixed holding member 21 and, in addition, the flange portion 42 comes into contact with the two sliding surfaces 35 of the fixed holding member 21. The two slide fixing screws 25 pass through the two respective long holes 48 in the slide holding member 22 and are fastened to the two respective female threaded screws 36 in the fixed holding member 21.

The two slide fixing screws 25 that are fastened to the two female threaded screws 36 move along the two long holes 48, respectively, so that the slide holding member 22 is supported by the fixed holding member 21 so as to be capable of translating in a direction parallel to a translation direction 81, as illustrated in FIG. 10. The translation direction 81 is parallel to the two parallel lines along which the two long holes 48 are formed. The two slide fixing screws 25 are tightly fastened to the two respective female threaded screws 36, so that the slide holding member 22 is appropriately fixed to the fixed holding member 21 such that the slide holding member 22 does not move relative to the fixed holding member 21.

The rotation holding member 23 is appropriately disposed in the rotating member storage space 43 such that the image capturing opening 66 is connected to the image capturing opening 49 and the image capturing opening 34 and, in addition, the three contact points 52 come into contact with the sliding surface 63. The three contact points 52 come into contact with the sliding surface 63, so that the rotation holding member 23 is supported by the slide holding member 22 so as to be rotatable about three axes orthogonal to each other at the center of the spherical surface along which the sliding surface 63 is formed.

The retainer plate 26 is appropriately disposed on the slide holding member 22 and the rotation holding member 23 such that the three projections 46 disposed on the slide holding member 22 pass through the three fitting holes 73 and, in addition, the boss portion 62 included in the rotation holding member 23 passes through the opening portion 44. Because the retainer plate 26 is appropriately disposed, the rotation holding member 23 is sandwiched between the slide holding member 22 and the retainer plate 26. The two screws 27 pass through the two respective fixing holes 71 provided on the retainer plate 26 in the state in which the rotation holding member 23 is sandwiched by the slide holding member 22 and the retainer plate 26 and are fitted to the two respective female threaded screws 47 in the slide holding member 22.

Figure 11:
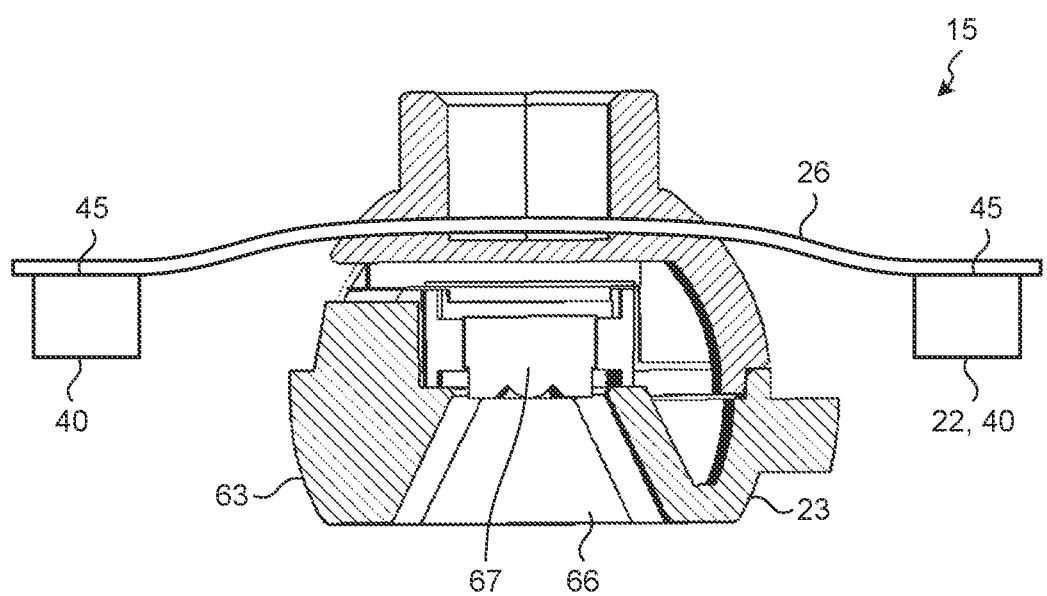
FIG. 11 is a sectional view illustrating the image capturing unit.

FIG. 11 is a sectional view illustrating the image capturing unit 15. The retainer plate 26 is elastically deformed as a result of the two screws 27 being tightly fastened to the two respective female threaded screws 47 and comes into contact with both of the two mounting surfaces 45. Because the retainer plate 26 is elastically deformed, the retainer plate 26 applies an elastic force to the rotation holding member 23 such that a frictional force acted between the rotation holding member 23 and the slide holding member 22 or the retainer plate 26 is greater than a predetermined force. The rotation holding member 23 is appropriately fixed to the slide holding member 22 so as to avoid three-axis rotation relative to the slide holding member 22 as a result of the elastic force applied from the retainer plate 26. In other words, the slide holding member 22 and the rotation holding member 23 are formed such that the retainer plate 26 is sufficiently bent when the rotation holding member 23 is appropriately fixed to the slide holding member 22. The camera 67 is fixed to the placement board 2 via the fixed holding member 21, the slide holding member 22, and the rotation holding member 23.

Operation of the Identity Verification Apparatus 1

A user places an identity verification document on the placement board 2 when the user desires to show the identity verification document by using the identity verification apparatus 1. The identity verification document with characters indicating personal information on the user and with a face photo of the user pasted thereon. Examples of identity verification documents include a driver's license and a My Number card. After the identity verification document is appropriately placed on the placement board 2, the user operates the touch panel 12 in accordance with an instruction displayed on the touch panel 12.

When the touch panel 12 is appropriately operated, the identity verification apparatus 1 captures an image of the identity verification document placed on the placement board 2 by using the camera 67 and takes a photograph of the face of the user by using the face authentication camera 11. The identity verification apparatus 1 performs character recognition on the characters written on the identity verification document by performing image processing on the captured image of the identity verification document, and then, extracts a face photo attached to the identity verification document. Furthermore, by comparing the extracted face photo of the user to the photograph taken by the face authentication camera 11, the identity verification apparatus 1 judges whether the person exhibited on the extracted face photo of the user and the user are the same person. The identity verification apparatus 1 outputs the judgement result and character data that is generated on the basis of character recognition to an output device (not illustrated).

Positional Adjustment Method of the Camera 67

Figure 12:
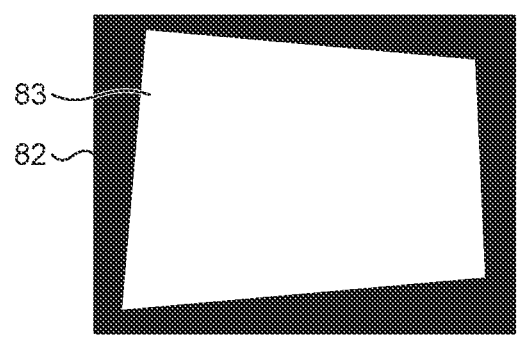
FIG. 12 is a diagram illustrating an image captured by a camera.

FIG. 12 is a diagram illustrating an image 82 captured by the camera 67. When a rectangular subject is appropriately placed on the placement board 2, the camera 67 is able to capture the image 82 of the subject by using light passing through the image capturing opening 66, the image capturing opening 49, and the image capturing opening 34. The image 82 has a rectangular shape and exhibits a picture 83 of the subject. When the camera 67 is not disposed at an appropriate position, the image 82 sometimes exhibits the picture 83 such that the picture 83 is formed in a square shape that is not rectangular shape.

Figure 13:
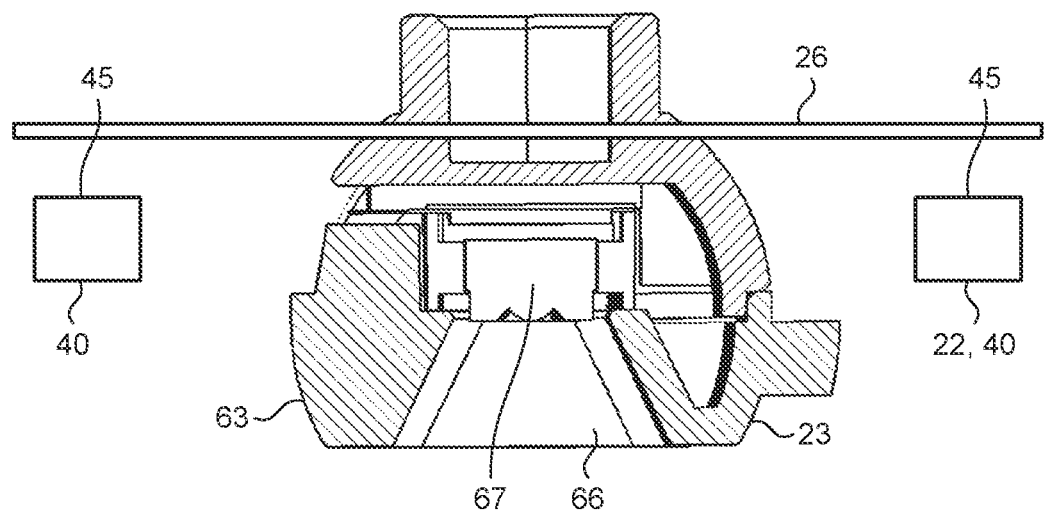
FIG. 13 is a sectional view illustrating the image capturing unit when two screws are not tightly fasten to two female threaded screws, respectively.

The identity verification apparatus 1 is able to adjust a position in which the camera 67 is disposed such that the camera 67 is disposed at an appropriate position. When the position of the camera 67 is adjusted, the cover 3 of the identity verification apparatus 1 is removed and the two screws 27 that are fastened to the two respective female threaded screws 47 are loosened. When the two screws 27 are loosened, as illustrated in FIG. 13, the retainer plate 26 is away from the two mounting surfaces 45 or away from at least one of the two mounting surfaces 45. FIG. 13 is a sectional view illustrating the image capturing unit 15 when the two screws 27 are tightly fastened to the two respective female threaded screws 47. The elastic force applied by the retainer plate 26 to the rotation holding member 23 is reduced as a result of the retainer plate 26 being away from the two mounting surfaces 45. When the elastic force applied by the retainer plate 26 to the rotation holding member 23, the rotation holding member 23 is not fixed to the slide holding member 22 and is rotatable about the rotation axis that passes through the center of the spherical surface along which the sliding surface 63 is formed.

Figure 14:
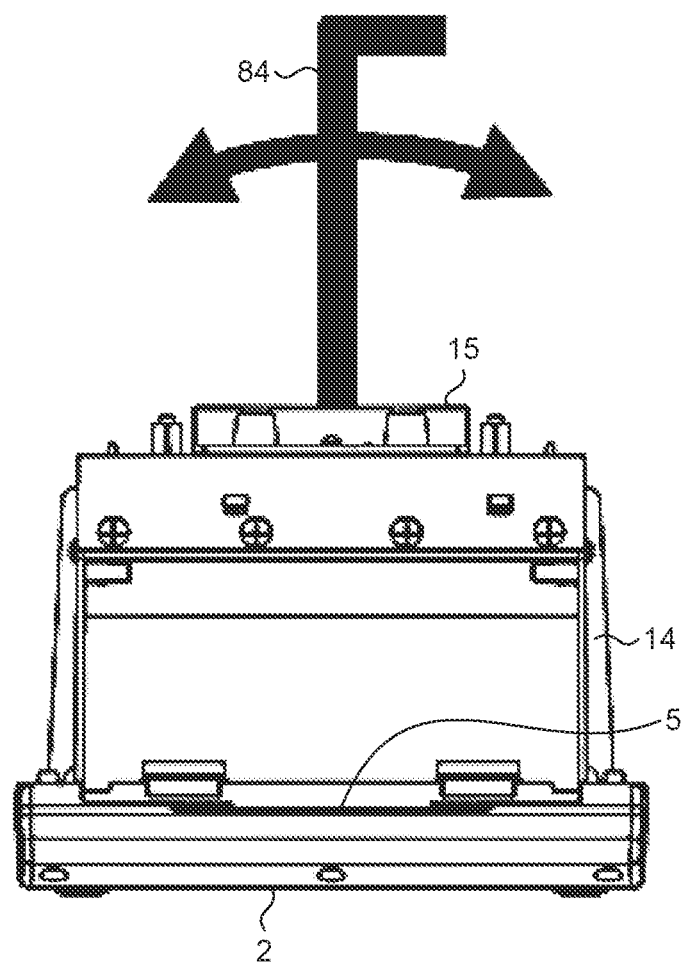
FIG. 14 is a front view illustrating a hexagon wrench fitted to respective fitting holes and the image capturing unit.
Figure 15:
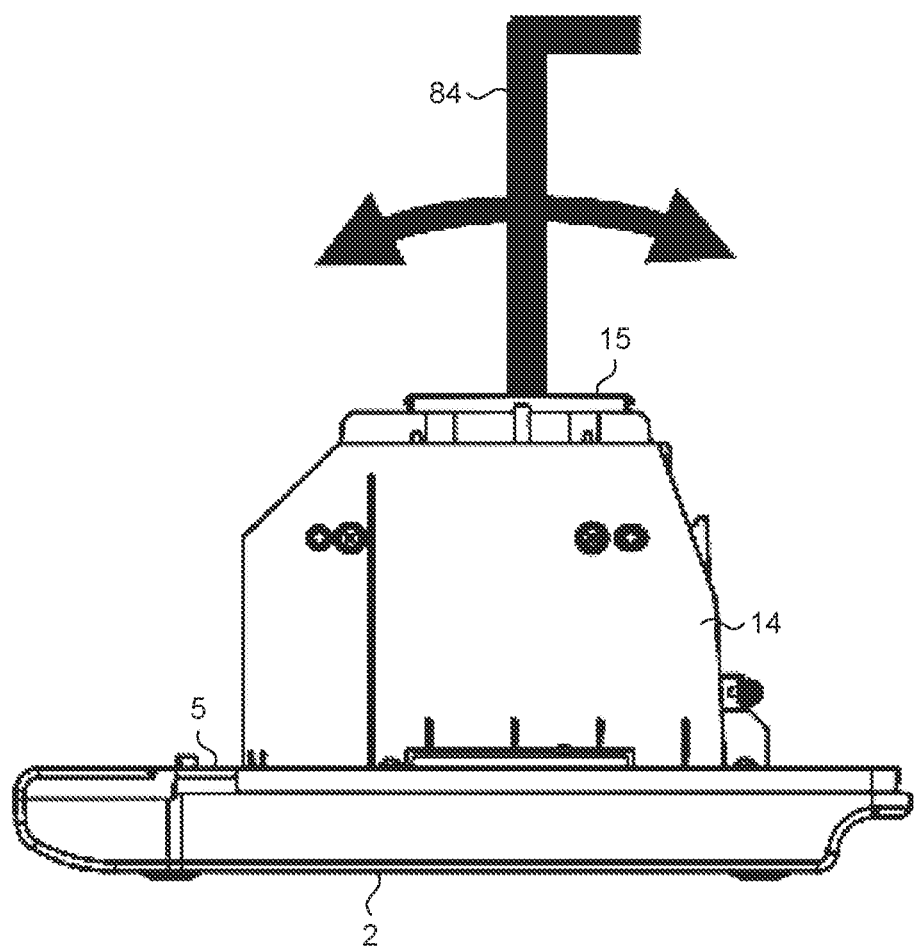
FIG. 15 is a side view illustrating the hexagon wrench fitted to the respective fitting holes.

As illustrated in FIG. 14, when the cover 3 is removed from the identity verification apparatus 1, a hexagon wrench 84 is fitted to the fitting hole 64 in the rotation holding member 23. FIG. 14 is a front view illustrating the hexagon wrench 84 fitted to the fitting hole 64 and the image capturing unit 15. By using the hexagon wrench 84 fitted to the fitting hole 64, an operator who adjusts a position of the camera 67 is able to easily rotate the rotation holding member 23 relative to the slide holding member 22 about the rotation axis passing through the spherical surface along which the sliding surface 63 is formed. For example, by using the hexagon wrench 84 fitted to the fitting hole 64, the operator is able to rotate the rotation holding member 23 about the rotation axis that is parallel to the front-rear direction. The front-rear direction is parallel to the plane along which the placement surface 5 is formed. As illustrated in FIG. 15, the operator is able to further rotate the rotation holding member 23 about the rotation axis that is parallel to the width direction by using the hexagon wrench 84 fitted to the fitting hole 64. FIG. 15 is a side view illustrating the hexagon wrench 84 fitted to the fitting hole 64. The width direction is parallel to the plane along which the placement surface 5 is formed and perpendicular to the front-rear direction.

Figure 16:
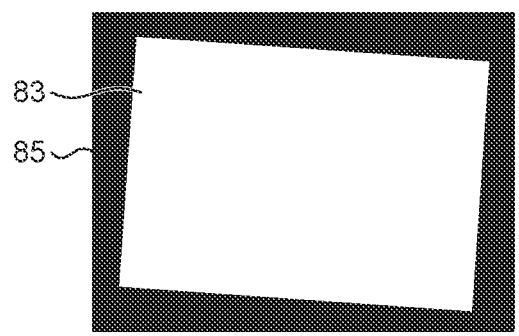
FIG. 16 is a diagram illustrating another image captured by the camera.

The identity verification apparatus 1 is able to capture an image 85 illustrated in FIG. 16 as a result of the rotation holding member 23 rotating about the rotation axis that is parallel to the plane along which the placement surface 5 is formed. FIG. 16 is a diagram illustrating another type of the image 85 captured by the camera 67. The image 85 exhibits the picture 83 so as to be formed in a rectangular shape. In other words, because the rotation holding member 23 rotates about the rotation axis that is parallel to the plane along which the placement surface 5 is formed, the camera 67 is able to be disposed at an appropriate direction so as to capture the image 85 in which the picture 83 is formed in a rectangular shape. If the camera 67 is not disposed at an appropriate position, the image 85 sometimes exhibits the picture 83 inclined relative to the image 85 such that a side of the rectangle formed by the picture 83 is not parallel to any side of the rectangle formed by the image 85.

Figure 17:
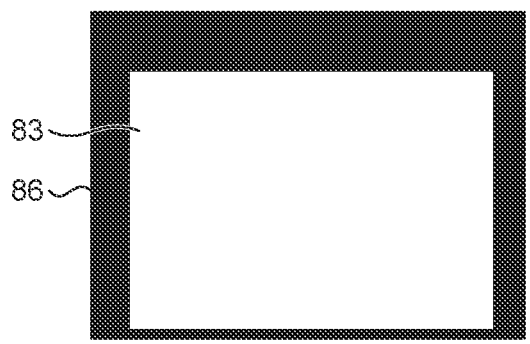
FIG. 17 is a diagram illustrating still another image captured by the camera.

By using the hexagon wrench 84 fitted to the fitting hole 64, the operator is able to further rotate the rotation holding member 23 about the rotation axis that is perpendicular to the plane parallel to the placement surface 5. The identity verification apparatus 1 is able to capture an image 86 illustrated in FIG. 17 as a result of the rotation holding member 23 rotating about the rotation axis that is perpendicular to the plane along which the placement surface 5 is formed. FIG. 17 is a diagram illustrating still another type of the image 86 captured by the camera 67. The image 86 exhibits the picture 83 such that the picture 83 has a rectangular shape and, in addition, a side of the rectangle of the picture 83 is parallel to a side of the rectangle of the image 86. In other words, because the rotation holding member 23 rotates about the rotation axis that is perpendicular to the plane along which the placement surface 5 is formed, the camera 67 is able to be disposed at an appropriate orientation such that the picture 83 is not inclined relative to the image 85.

The rotation holding member 23 is fixed to the slide holding member 22 by the rotational fixing portion 24 in the state in which the rotation holding member 23 is disposed such that the image 85 is captured. In other words, the two screws 27 are fastened to the two respective female threaded screws 47 in the slide holding member 22 such that the retainer plate 26 comes into contact with the two mounting surfaces 45 in the state in which the rotation holding member 23 is disposed such that the image 85 is captured. If the camera 67 is not disposed at an appropriate position, the image 86 sometimes exhibits the picture 83 at the position other than the center of the image 86.

In the identity verification apparatus 1, when the position of the camera 67 is adjusted in a case in which the picture 83 is not exhibited at the center of the image 86, the two female threaded screws 36 in the fixed holding member 21 fastened to the two respective slide fixing screws 25 are loosened. When the two slide fixing screws 25 are loosened, the slide holding member 22 is able to translate in the direction parallel to the translation direction 81 relative to the fixed holding member 21.

Figure 18:
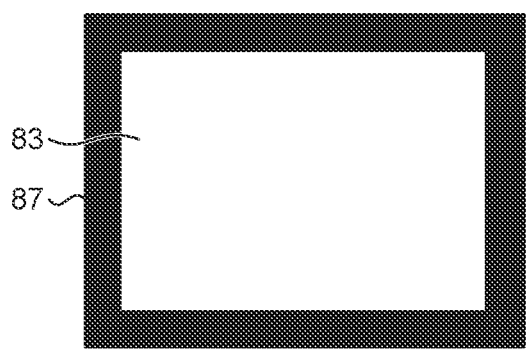
FIG. 18 is a diagram illustrating still another image captured by the camera.

The slide holding member 22 translates in a direction parallel to the translation direction 81, so that the identity verification apparatus 1 is able to capture an image 87 illustrated in FIG. 18. FIG. 18 is a diagram illustrating another example of the image 87 captured by the camera 67. The image 87 exhibits the picture 83 at the center of the image 87. In other words, the slide holding member 22 translates in a direction parallel to the translation direction 81 relative to the fixed holding member 21, so that the camera 67 is able to be disposed at an appropriate position such that the picture 83 is exhibited at the center of the image 87.

In general, inexpensive cameras are sometimes manufactured with a low degree of accuracy and positional relationships between an outer shell of a camera and the angle of view of the camera main body are sometimes individually different for each camera. Even if this type of camera is used as the camera 67, the identity verification apparatus 1 is able to fix the camera 67 to the placement board 2 in the state in which the camera 67 is appropriately disposed such that the angle of view of the camera 67 is disposed in a predetermined orientation on the placement board 2. Because the camera 67 is appropriately disposed, the identity verification apparatus 1 is able to appropriately capture an image of an identity verification document that is appropriately placed on the placement board 2. Because the image of the identity verification document is appropriately captured, the identity verification apparatus 1 is able to appropriately perform character recognition on the characters written on the identity verification document on the basis of the image and appropriately extract a face photo attached to the identity verification document from the image.

Effects of the Image Reading Apparatus According to the Embodiment

The image reading apparatus according to the embodiment includes the placement board 2, the camera 67, the rotation holding member 23, the slide holding member 22, and the rotational fixing portion 24. The camera 67 captures an image of an identity verification document placed on the placement board 2. The camera 67 is fixed to the rotation holding member 23. The slide holding member 22 is fixed to the placement board 2. The rotational fixing portion 24 fixes the rotation holding member 23 to the slide holding member 22. The sliding surface 63 along the spherical surface is formed on the rotation holding member 23. The sliding surface 63 is formed to have a convex surface. The camera 67 is disposed inside the spherical surface. Three contact points 52 disposed at different positions are formed on the slide holding member 22. The rotation holding member 23 is rotatably supported about three axes by the slide holding member 22 as a result of the three contact points 52 coming into contact with the sliding surface 63.

In general, inexpensive cameras are sometimes manufactured with a low degree of accuracy and positional relationships between an outer shell of a camera and the angle of view of the camera main body are sometimes individually different for each camera. Even if this type of inexpensive camera is used as the camera 67, the image reading apparatus according to the embodiment is able to fix the camera 67 to the placement board 2 in the state in which the camera 67 is appropriately disposed such that the angle of view of the camera 67 is disposed in a predetermined orientation on the placement board 2. Because the angle of view of the camera 67 is appropriately disposed, the image reading apparatus according to the embodiment is able to appropriately capture an image of an identity verification document that is appropriately placed on the placement board 2. Furthermore, the image reading apparatus according to the embodiment is able to reduce a manufacturing cost as a result of the use of this type of inexpensive camera as the camera 67.

Furthermore, the rotational fixing portion 24 included in the image reading apparatus according to the embodiment includes the retainer plate 26 and the two screws 27. The two screws 27 fix the retainer plate 26 to the slide holding member 22 in the state in which the retainer plate 26 is elastically deformed as a result of the rotation holding member 23 being sandwiched between the retainer plate 26 and the slide holding member 22. At this time, the image reading apparatus according to the embodiment is able to apply an elastic force of the retainer plate 26 to the rotation holding member 23 and appropriately fix the rotation holding member 23 to the placement board 2 such that the rotation holding member 23 does not rotate relative to the slide holding member 22.

Incidentally, the rotation holding member 23 included in the image reading apparatus according to the above described embodiment is fixed to the slide holding member 22 by using the retainer plate 26 and the two screws 27; however, the rotation holding member 23 may be fixed to the slide holding member 22 via another rotational fixing portion. An example of the rotational fixing portion includes an adhesive agent. In this case too, the image reading apparatus is able to be fixed to the placement board 2 in a state in which the camera 67 is appropriately disposed and the image reading apparatus is able to appropriately capture an image of an identity verification document that is appropriately placed on the placement board 2.

Furthermore, the image reading apparatus according to the embodiment further includes the fixed holding member 21 that is fixed to the placement board 2 and the two slide fixing screws 25. The slide holding member 22 is translatably supported by the fixed holding member 21. The two slide fixing screws 25 fix the slide holding member 22 to the fixed holding member 21. At this time, image reading apparatus according to the embodiment is able to fix the camera 67 to the placement board 2 in the state in which the camera 67 is appropriately disposed such that the angle of view of the camera 67 is disposed at a predetermined position on the placement board 2. The camera 67 is appropriately disposed, so that the image reading apparatus according to the embodiment is able to appropriately capture an image of an identity verification document that is appropriately placed on the placement board 2.

Incidentally, the slide holding member 22 included in the image reading apparatus according to the above described embodiment is supported so as to be capable of translating in a direction parallel to the placement board 2; however, the slide holding member 22 may be fixed to the placement board 2 so as not to translate in a direction parallel to the placement board 2. In this case too, the image reading apparatus is able to be fixed to the placement board 2 in the state in which the angle of view of the camera 67 is appropriately disposed, and the image reading apparatus is able to appropriately capture an image of an identity verification document that is appropriately placed on the placement board 2.

Furthermore, the image reading apparatus according to the embodiment further includes the face authentication camera 11 that is different from the camera 67. The face authentication camera 11 is fixed to the placement board 2. At this time, the identity verification apparatus 1 provided with the image reading apparatus according to the embodiment is able to appropriately capture an image of a face of a user that places an identity verification document on the placement board 2. If a face photo is pasted to the identity verification document, the image reading apparatus according to the embodiment is able to appropriately capture an image of an identity verification document; therefore, the identity verification apparatus 1 is able to appropriately extract the face photo pasted to the identity verification document from the image. In other words, the identity verification apparatus 1 is able to acquire, by using a single device, the face photo and a photograph that are used to judge whether a person exhibited in the face photo pasted to the identity verification document and a user who carries the identity verification document are the same person.

Incidentally, in the image reading apparatus according to the above described embodiment, the sliding surface 63 is formed on the rotation holding member 23; however, a sliding surface may be formed on the slide holding member 22. At this time, the sliding surface formed on the slide holding member 22 is formed to have a concave surface so as to be along the spherical surface, and three contact points are formed on the rotation holding member 23. The three contact points come into contact with the sliding surface of the slide holding member 22; therefore, the camera 67 is disposed inside the spherical surface along which the sliding surface is formed and the rotation holding member 23 is accordingly supported by the slide holding member 22 so as to be rotatable about the rotation axis passing through the spherical surface. In this case too, the image reading apparatus is able to be fixed to the placement board 2 in the state in which the camera 67 is appropriately disposed, and the image reading apparatus is able to appropriately capture an image of an identity verification document that is appropriately placed on the placement board 2.

Incidentally, the rotational fixing portion 24 included in the image reading apparatus according to the above described embodiment directly comes into contact with the rotation holding member 23; however, a rubber plate that is sandwiched between the rotation holding member 23 and the retainer plate 26 may be further provided. The rubber plate is formed of an elastomer exemplified by rubber and is elastically deformed as a result of being sandwiched between the rotation holding member 23 and the retainer plate 26 when the rotation holding member 23 is fixed to the slide holding member 22. At this time, the image reading apparatus is able to prevent the rotation holding member 23 from being slid relative to the slide holding member 22 and is able to tightly fix the rotation holding member 23 to the slide holding member 22.

Incidentally, the image reading apparatus according to the above described embodiment is installed in the identity verification apparatus 1; however, the image reading apparatus may be used as an overhead scanner. In this case too, the image reading apparatus is able to be fixed to the placement board 2 in the state in which the camera 67 is appropriately disposed, and the image reading apparatus is able to appropriately capture an image of an identity verification document that is appropriately placed on the placement board 2.

The image reading apparatus according to the present disclosure is able to appropriately capture an image of a subject.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the disclosure have been described in detail, it should be understood that the various changes, substitutions, and alterations could be made hereto without departing from the spirit and scope of the disclosure.

What is claimed is:

1. An image reading apparatus comprising:
   a placement board;
   a camera that captures an image of a subject placed on the placement board;
   a first holding member to which the camera is fixed;
   a second holding member that is fixed to the placement board; and
   a fixing portion that fixes the first holding member to the second holding member, wherein
   a sliding surface along a spherical surface is formed on one of the first holding member and the second holding member,
   three contact points disposed at three different positions respectively are formed on the other one of the first holding member and the second holding member,
   the first holding member is rotatably supported about three axes by the second holding member as a result of the three contact points coming into contact with the sliding surface,
   the camera is disposed inside the spherical surface, and
   the fixing portion includes:
   a retainer plate; and
   a fastening member that fixes the retainer plate to the second holding member in a state in which the retainer plate is elastically deformed as a result of the first holding member being sandwiched between the retainer plate and the second holding member.

2. The image reading apparatus according to claim 1, wherein the sliding surface is formed to have a convex surface on the first holding member, and the three contact points are formed on the second holding member.

3. The image reading apparatus according to claim 1, wherein
   the fixing portion further includes an elastic member that is sandwiched between the first holding member and the retainer plate, and
   the elastic member is elastically deformed when the first holding member is fixed to the second holding member.

4. The image reading apparatus according to claim 1, further comprising:
   a third holding member that is fixed to the placement board; and
   a fixing member that fixes the second holding member to the third holding member, wherein
   the second holding member is translatably supported by the third holding member.

5. The image reading apparatus according to claim 1, further comprising another camera that is different from the camera, wherein
   the other camera is fixed to the placement board.

6. An image reading apparatus comprising:
   a placement board;
   a camera that captures an image of a subject placed on the placement board;
   a first holding member to which the camera is fixed;
   a second holding member that is fixed to the placement board;
   a third holding member that is translatably supported by the second holding member;
   a fixing portion that fixes the first holding member to the second holding member; and
   a fixing member that fixes the third holding member to the second holding member, wherein
- a sliding surface along a spherical surface is formed on one of the first holding member and the third holding member,
- three contact points disposed at three different positions respectively are formed on the other one of the first holding member and the third holding member,
- the first holding member is rotatably supported about three axes by the third holding member as a result of the three contact points coming into contact with the sliding surface, and
- the camera is disposed inside the spherical surface.

\* \* \* \* \*